March 17, 1953        J. HAGEN        2,632,086
TEMPERATURE CONTROL APPARATUS
Filed July 15, 1949
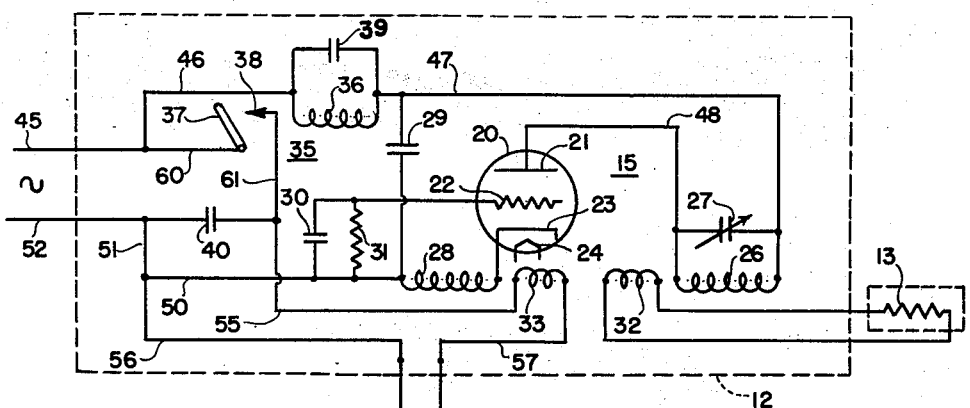
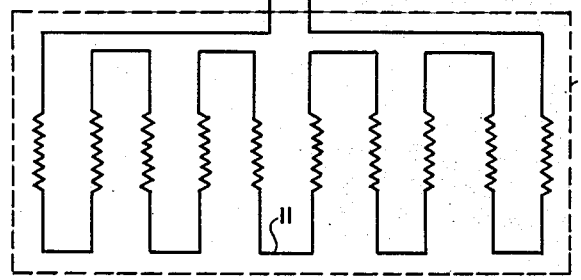
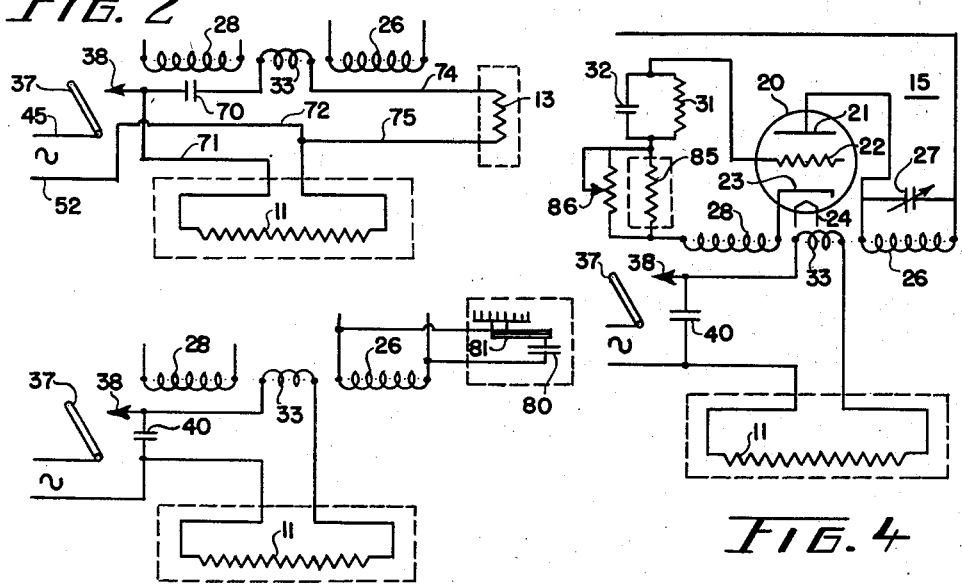
Inventor
JERRY HAGEN
George H Fisher
Attorney Patented Mar. 17, 1953

2,632,086

UNITED STATES PATENT OFFICE 2,632,086

TEMPERATURE CONTROL APPARATUS

Jerry Hagen, Minneapolis, Minn., assignor to Minneapolis-Honeywell Regulator Company, Minneapolis, Minn., a corporation of Delaware Application July 15, 1949, Serial No. 105,028

12 Claims. (Cl. 219—20)

The present invention is concerned with the automatic control of an electric heating element such as used in an electric blanket.

In controlling the temperature of an electric blanket, it is desirable to maintain a temperature which will give maximum comfort to the person using the blanket and, to do this, it is frequently necessary to modify the temperature of the blanket in accordance with the temperature of the room where the blanket is used. It is also advantageous to control the blanket temperature within a relatively small differential to prevent thereby wide swings in temperature, such control requiring sensitive apparatus. The present invention provides the desired control by using an electrical oscillator circuit for measuring the temperature of the blanket by determining the resistance of the heater element and the room or space temperature as determined by a temperature responsive impedance connected in said circuit. This oscillator circuit operates by controlling a relay for energizing the heater from a source of power when certain temperatures exist in the room and at the heater element.

It is therefore an object of the present invention to provide a control apparatus for controlling the temperature of an electric heating element in accordance with changes in the impedance of the element as those changes affect the operation of an electric oscillator.

A further object of the present invention is to provide a control apparatus including an electrical oscillator which is adapted to maintain a predetermined temperature of a heating element in accordance with the changes in resistance of said element.

A still further object of the present invention is to provide a control apparatus for an electrical heating element having an appreciable temperature coefficient of resistance, the apparatus including an electrical oscillator affected by changes in the resistance of the heating element and by the space temperature wherein another temperature responsive resistor is located.

Another object of the present invention is to provide a control apparatus for an electric blanket having a heating element with a sufficient temperature coefficient of resistance, said apparatus including an electrical oscillator controlled by the impedance of the heating element and by an impedance which is variable with changes in room temperature.

These and other objects of the present invention will be obvious upon a consideration of the following specification, claims and the appended drawings of which:

Figure 1 shows diagrammatically one form of the invention as applied to the control of an electric blanket with an impedance affected by room temperature also affecting operation of the control.

Figure 2 shows a slightly modified arrangement for obtaining room temperature compensation in the control of the apparatus.

Figure 3 shows a further modification wherein room temperature variations vary the tuning of the main control circuit.

Figure 4 shows a further modification wherein the feedback circuit in the electrical oscillator is varied in accordance with changes in space temperature.

Referring now to Figure 1, the numeral 10 represents an electric blanket or heating pad of any desired type heated by a heating element 11 which has an appreciable temperature coefficient of resistance such as a copper cadmium alloy. The controls for heater element 11 are located within the enclosure 12, these controls being affected by the resistance of the element 11 and by a further resistance 13, the latter of which is affected by room temperature and may or may not be inside enclosure 12. The control apparatus within enclosure 12 includes an electronic oscillator 15 and a relay 35 operable thereby. The oscillator 15 comprises an electron discharge device 20 having an anode 21, control electrode 22, and cathode 23, the latter of which is heated to be electron emissive by a suitable heater 24. Also included in the oscillator circuit is an output tank circuit including an inductance 26 with a tuning capacitor 27 connected in parallel therewith. Located on the input of the discharge device 20 is a feedback inductance 28 which is mutually coupled to the winding 26. A suitable bypass condenser 29 is provided between the feedback coil 28 and the anode circuit to supply a low impedance pass for alternations of the oscillator 15. Connected between the coil 28 and the control electrode 22 is a condenser 30 which serves as a low impedance path for the feedback of the oscillations of the oscillator to the control electrode. A suitable biasing resistor 31 is connected in parallel with the condenser 30.

A further coil 33 is associated with the oscillator 15 and this coil has in circuit therewith the heater element 11 of the electric blanket. This coil is provided for loading the oscillator in accordance with the changes in resistance of the element 11. A further loading coil 32 is provided to further load the operation of the oscillator in accordance with changes of the resistance of the room temperature responsive resistor 13.

Located in the energizing circuit for the discharge device 20 is the afore-mentioned relay 35 which is actuated in accordance with the current flow in the oscillator circuit 15. This relay comprises a winding 36 and a switch blade 37 normally biased out of engagement with an associated contact 38. A by-pass condenser 39 is connected in parallel with the winding 36 to by-pass alternations flowing in the energizing circuit for winding 36 of the relay. A further condenser 40 is provided for suppressing line transients when the relay 35 is pulled in and to form a low impedance path for the high frequency oscillations flowing in the loading circuit which includes coil 33 and heating element 11.

Operation of Figure 1

In considering the operation of the apparatus shown in Figure 1, it will first be assumed that the blanket heating element 11 is at a desired temperature in accordance with room temperature; hence there is no need for energization of said heater. Under these conditions, the discharge device 20 and the associated circuits will be in oscillation at a relatively high radio frequency when compared to the frequency of the alternating current power furnished through the input power lines 45 and 52. The circuit to the discharge device may be traced from the input power line 45 through conductor 46, relay winding 36, conductor 47, coil 26, conductor 48, anode 21, cathode 23, coil 28, and conductors 50 and 51 to the other input power line 52.

Since the power supply is alternating current, the discharge device 20 will be conductive only when the alternating current is phased so that the anode 21 is positive with respect to the cathode. This will mean that the circuit can oscillate only every other half cycle when the anode is positive. When the tube 20 is operating on the positive half cycle of the alternating current power source, and the circuit is oscillating due to the sufficiency of the mutual coupling between the output coil 26 and the feedback coil 28, there will be current flow through the relay winding 36. This current flow, however, is not sufficient to energize the relay 35 as the discharge device 20, when acting in an oscillator circuit draws a minimum of current.

To stabilize the operation of the oscillating circuit, the parallel connected condenser 30 and resistor 31 act to maintain a relatively constant direct current bias on the control electrode 22 and provide a low impedance path for the radio frequency oscillations in the feedback circuit from the coil 28 to the control electrode 22. The tuning of the oscillator and the selection of the control point is determined by the adjustment of the tuning capacitor 27.

As mentioned above, the coil 33 is mutually coupled to the coil 26 of oscillator 15 and there will be a certain amount of current flowing in the circuit connected to the coil 33 because of the voltage induced therein by the coil 26. The current flow in this circuit may be traced from the left hand terminal of coil 33 through conductor 55, condenser 40, conductor 51, conductor 56, heating element 11, and conductor 57 back to the right hand terminal of coil 33. When the temperature of the heating element 11 is at a desired value the resistance of the element will be such as to limit the current flow in the last traced circuit. With the current flow limited by the resistance of the heater 11, the current flow in this circuit will have no appreciable effect upon the operation of the oscillator 15.

It will also be noted that the coil 32 is mutually coupled to the output coil 26 so that there will be a voltage induced in the coil 32. Because of the voltage induced in the coil 32 there will be a resultant current flow in this circuit which will be through the resistor 13, the latter of which is exposed to room temperature. If the room temperature is above a predetermined value, the current flow in this last circuit will have no appreciable effect upon the operation of the oscillator.

In the event that the temperature of the heater 11 should decrease, with a positive temperature coefficient of resistance, there will be an increased current flow in the circuit coupled to the oscillator by coil 33. Due to the poor regulation of the oscillator, the current flow in the output coil 26 will not be sufficient to supply the increased current in the circuit including coil 33 and to also supply a feedback signal to maintain the oscillator operative. Thus, the circuit goes out of oscillation and the potential on the control electrode 22 will approach the cathode potential so that there will be an increase in the current flowing through the discharge device 20. This increase in current flow will be sufficient to pull in the relay 35. When the relay 35 operates to pull switch blade 37 into engagement with contact 38, an energizing circuit will be completed to the heater 11. This circuit may be traced from the input line 45 through conductor 60, switch blade 37, switch contact 38, conductor 61, conductor 55, coil 33, conductor 57, heater 11, and conductors 56 and 51 back to the other line 52. The condenser 40, connected between conductors 51 and 61, serves as a transient filter for spurious input signals on the lines 45 and 52. The impedance of this condenser is such as to be relatively high to the input power frequency and relatively low when compared to the oscillation frequency.

After the relay 35 has been operative for a certain length of time, the power supplied to the heater 11 through the relay contacts will have caused the temperature of the heater to increase. When the temperature has increased a predetermined amount the resistance of the heater will have increased sufficiently so that it will be possible to put the oscillating circuit 15 back into oscillation again due to the decreased loading of the oscillator. When the circuit goes back into oscillation the control electrode 22 will assume a more negative potential and the current flow through the discharge device 20 will be decreased sufficiently to render the relay 35 inoperative. When the relay becomes inoperative the switch blade 37 will move from engagement with contact 38 to open the energizing circuit to the heater 11 and start it cooling. As the heater 11 cools and its resistance decreases, there is an increased current flow in the circuit which is energized by the coil 33, the circuit will again go out of oscillation and the relay 35 will be energized to connect the heater 11 to the power source. This mode of operation will result in the cyclic energization of the heater 11 so that it will tend to maintain a substantially constant temperature.

The operation as considered thus far has assumed that the room temperature has remained constant. Obviously, if the room temperature is constant, the current flow in the circuit including coil 32 and resistor 13 will remain constant. If the room temperature should drop, it is desired that the heater 11 be energized somewhat sooner than might otherwise occur if the temperature of the element 11 alone were considered. With the drop in room temperature, and a positive temperature coefficient of resistance of resistor 13, there will be an increased current flow in the circuit which includes the coil 32 and resistor 13. This increased current flow will have the effect of loading the oscillator in the same way that a decrease in temperature of the element 11 causes loading of the oscillator. If the room temperature drops sufficiently, the current flow in the coil 32 and the current flow in the coil 33 will be sufficient to cause the oscillator to go out of oscillation so that there will be an increase in the current flow to the discharge device 29 and the relay 35 will become energized.

If the room temperature should stay at a lower value, it will be necessary for the heater 11 to be heated to a higher temperature so that the current flow in the coil 33 will be less than otherwise. When the heater has increased in temperature sufficiently so that the current flow in the coil 33, when considered with that of flowing in the coil 32, is not loading down the oscillator, the oscillator 15 will go back into oscillation and the relay 35 will drop out. It will thus be noted that as the room temperature goes down the control point for the blanket temperature will rise and the element 11 will be cyclically energized at a new rate to maintain a higher blanket temperature.

Figure 2

Figure 2 shows a slightly modified arrangement for obtaining room temperature compensation. In Figure 2, corresponding components between Figures 1 and 2 carry corresponding reference numerals. Here, a single loading coil 33 is provided and this loading coil has in series therewith the room temperature responsive resistor 13, the blanket heater 11 and a condenser 70. The condenser 70 is chosen so as to be a high impedance to the power supply voltage and a low impedance to the alternating signals arising from the oscillator output coil 26. Since the resistor 13 and the heater 11 are in series with respect to the loading coil 33, a decrease in resistance of one of the components must be matched by a corresponding increase in resistance of the other in order that the current flow in the loading coil 33 will not cause loading of the oscillator to maintain it inoperative. When the oscillator becomes inoperative the switch blade 37 will engage contact 38 and the heater will be energized in a circuit that may be traced from the input power line 45 through switch blade 37, switch contact 38, conductor 71, heater 11, and conductor 72 back to the other input power line 52. It will also be noted that an electrical circuit can be traced from the input power line through the switch 37, switch contact 38, condenser 70, coil 33, conductor 74, resistor 13, and conductors 75 and 72 back to the other input power line 52. While the current flow in the last traced circuit will not be very large, due to the presence of the capacitor 70, the current flow will be sufficient to cause a slight amount of heating of the resistor 13. The heating of this resistor 13 and the heating of the element 11, connected directly to the power supply, will cause the oscillator to go back into oscillation at a time somewhat earlier than the arrangement shown in Figure 1. This is due primarily to the heating of the resistor 13 and it gives the apparatus an anticipating effect. By properly proportioning the size of the resistance in resistor 13 with respect to the amount of resistance in the heater 11, it is possible to vary the cycling rate at which the oscillator goes into and out of oscillation and this cycling rate will be dependent upon the room temperature to which the resistor 13 is exposed.

Figure 3

In Figure 3, a further modification is shown on the manner of obtaining room temperature compensation. Corresponding components between Figures 1 and 3 carry corresponding reference numerals. In this arrangement, room temperature compensation is to be accomplished by a variable condenser 80 whose impedance is adjusted by a bimetallic element 81. This has the effect of tuning the resonant frequency of the output tank circuit which includes the coil 26. When the capacity in the output tank circuit is decreased, the oscillator tends to go out of oscillation. It will then be obvious that for normal operating conditions it will be desired to have the room temperature, upon decreasing, to decrease the capacity in the output tank circuit. This will tend to weaken the oscillations of the oscillator. With this, a smaller change in resistance of the heater element 11 will cause the oscillator to go out of oscillation so that the control relay will be rendered operative to energize the heater 11. It will be obvious that if the room temperature rises, the reverse control effect will result.

Figure 4

In the modification shown in Figure 4, room temperature compensation is accomplished by varying the feedback signal that is applied to the control electrode 22. As in the other modified circuits, corresponding components between Figures 1 and 4 carry corresponding reference numerals. In this figure the feedback circuit between the coil 28 and the control electrode 22 contains a resistor 85 which is responsive to the room temperature wherein the blanket 11 is located. An authority rheostat 86 is connected in parallel with the resistor 85 in order to vary the effect the resistor 85 will have upon the operation of the oscillator 15. The addition of a resistor between the left terminal of coil 28 and the control electrode 22 without a condenser in parallel therewith has the effect of decreasing the feedback signal to the control electrode 22 as there will be a voltage drop across this added resistor 85. Any voltage drop in this feedback circuit will obviously decrease the amount of feedback signal applied directly to the control electrode 22 and thus weaken the oscillations of the oscillator 15. In the present modification, if it is desired to increase blanket temperature with a decreasing room temperature, it is necessary that the resistor 85 have a negative temperature coefficient of resistance so that its resistance will decrease with an increase in temperature. With such a temperature coefficient of resistance, a decrease in room temperature will cause an increase in the resistance of the resistor 85 that will result in a greater voltage drop across the resistor 85 and less voltage fed back to the control electrode 22 to maintain the oscillator 15 in oscillation. This will mean that a smaller amount of current flow in the loading circuit which includes the blanket heater 11 and the coil 33 will be efficient to load the oscillator and cause it to go out of oscillation at a temperature of heater element 11 higher than would be the case if the room temperature were higher.

Conclusion

From the foregoing it will be seen that a new and improved control has been provided for the controlling of the temperature of a heater by utilizing the change in resistance of the heater element and the temperature of the heater may be further adjusted in accordance with the temperature of the space wherein the heater is located. It will be obvious to those skilled in the art that many modifications can be made within the scope of the invention and therefore I intend to be limited solely by the scope of the appended claims.

What is claimed is:

1. Apparatus for controlling the temperature of a resistance element having an appreciable temperature coefficient of resistance, the combination comprising, a source of power, an electronic oscillating apparatus, inductive coupling means electrically coupled in controlling relation with said oscillator and having in circuit therewith said resistance element, said coupling means continuously loading said oscillator in accordance with changes in resistance of said resistance element for causing said oscillator to go into and out of oscillation, a temperature responsive element, circuit means including said temperature responsive element electrically coupled to said oscillator to load said oscillator and thereby further affect the oscillation thereof, and relay means in circuit with said oscillator to directly connect said source to said resistance element to effect energization of said resistance element to cause the same to be heated when the loading of said oscillator by said coupling means and said circuit means indicates the need for such energization.

2. Apparatus for controlling the temperature of an electrical blanket, comprising, a resistance element having an appreciable temperature coefficient of resistance, said resistance element being disposed in the blanket, an electrical oscillating apparatus, circuit means electrically coupled to said oscillating apparatus, said circuit means including said resistance element to load continuously said oscillating apparatus in accordance with changes in resistance of said element to affect the operation of said oscillator in accordance with changes in the resistance of said element, a source of power for said oscillating apparatus, and relay means in circuit with said oscillating apparatus, said relay means connecting said source in heat energizing relation to said element whenever the resistance of said element indicates a need for energization.

3. Apparatus for controlling the temperature of an electric blanket comprising, a heating element having an appreciable temperature coefficient of resistance, said heating element being disposed in the blanket, a source of power, electronic oscillating means energized by said source of power, means continuously inductively coupling said element to said oscillating means to affect the loading and oscillation thereof in accordance with resistance changes of said element, a temperature responsive element, circuit means including said temperature responsive element electrically coupled to said oscillating means to thereby further affect the oscillation thereof, and relay means in circuit with said oscillating means connecting said source of power in heat energizing relation to said heating element when said said heating element and said temperature responsive element loads said oscillator in a predetermined manner.

4. Apparatus for controlling the temperature of a heating element having an appreciable temperature coefficient of resistance, the combination comprising, a source of power, electronic oscillating means energized by said source, inductive coupling means to continuously couple said element into the oscillating circuit of said oscillating means, said element when so coupled directly affecting the oscillation of said oscillating means in accordance with the resistance changes of said element, a temperature responsive element, circuit means including said temperature responsive element electrically coupled to said oscillating means to thereby further affect the oscillation thereof, and relay means in circuit with said oscillating means to connect said source in heat energizing relation to said element when said element and said temperature responsive element affect said oscillator in a predetermined manner.

5. Apparatus for controlling the temperature of a heating element having an appreciable temperature coefficient of resistance, the combination comprising, a source of power, electronic oscillating means energized by said source of power, circuit means continuously electrically connecting said element to said oscillating means to affect the oscillation thereof in accordance with changes of resistance of said element, a further temperature responsive element, means electrically coupling said further element to said oscillating means to further affect the oscillations thereof, and relay means in circuit with said oscillating means to connect said source in heat energizing relation to said element when said oscillating means is affected in a predetermined manner by said elements.

6. Control apparatus for an electric blanket having a heating element with an appreciable temperature coefficient of resistance, the combination comprising, a source of power, an electrical oscillator energized by said source, loading circuit means continuously electrically connecting said heating element to said oscillator to directly affect the oscillation thereof in accordance with resistance changes of said element, and relay means in circuit with said oscillator, said relay means directly connecting said source to said element in heat energizing relation when said oscillator is operating in a predetermined manner.

7. Control apparatus for an electric blanket having a heating element with an appreciable temperature coefficient of resistance, the combination comprising, a source of power, an electronic oscillator energized by said source, control circuit means continuously electrically connecting said heating element to said oscillator to directly affect the oscillation thereof in accordance with resistance changes of said element, a device responsive to the temperature of the space wherein said blanket is located, means electrically connecting said device to further affect the operation of said oscillator, and relay means in circuit with said oscillator to connect said element directly to said source to heat said element when said oscillator is operating in a predetermined manner.

8. Apparatus for controlling the temperature of an electric blanket having a heating element with an appreciable temperature coefficient of resistance, the combination comprising, a source of power, an electronic oscillator having an inductive feedback circuit, a loading circuit including said heating element, means continuously connecting said loading circuit in inductive relation to said feedback circuit so that changes in resistance of said element will affect the operation of said oscillator, further impedance means responsive to room temperature, further circuit means inductively coupling said further impedance means to said feedback circuit to further affect the operation of said oscillator, and relay means in the energizing circuit of said oscillator, said relay means completing a power energizing circuit to said heating element when said oscillator is operating in a predetermined manner.

9. In an apparatus for controlling the temperature of an electric blanket having a heating element with an appreciable temperature coefficient of resistance, the combination comprising, a source of power, an electronic oscillator energized by said source, control circuit means including said heating element continuously electrically connecting said heating element to said oscillator to directly affect the oscillation thereof in accordance with changes in resistance of said element, room temperature responsive means, means including said temperature responsive means electrically connected to said oscillator to further effect the operation thereof by tuning said oscillator, and relay means in circuit with said oscillator, said relay means operating to complete a power energizing circuit from said source to said heating element to thereby heat said element when said oscillator is operating in a predetermined manner.

10. In an apparatus for controlling the temperature of an electric blanket having a heating element with an appreciable temperature coefficient of resistance, the combination comprising, a source of power, an electronic oscillator connected to said source, loading circuit means continuously electrically connecting said heating element to said oscillator to directly affect the oscillation thereof in accordance with changes in resistance of said element, a condenser whose reactance is varied in accordance with changes in room temperature connected in the operating circuit of said oscillator to affect the tuning thereof, and relay means in circuit with said oscillator, said relay means directly connecting said source in heat energizing relation to said element only when said oscillator operates in a predetermined manner.

11. Apparatus for controlling the temperature of an electric blanket having a heating element with an appreciable temperature coefficient of resistance, the combination comprising, a source of power, an electronic oscillator energized by said source, said oscillator including an electron discharge device having an anode, cathode and control electrode with a feedback circuit from said anode to said control electrode, loading circuit means continuously electrically connecting said heating element to said oscillator to thereby reflect the resistance of said element into said oscillator to directly affect the oscillation thereof in accordance with changes in resistance of said element, a room temperature responsive impedance connected in said feedback circuit for further affecting operation of said oscillator, and relay means in the anode circuit of said oscillator controlled by said oscillator, said relay means directly connecting said element in heat energizing relation to said source only when said oscillator operates in a predetermined manner.

12. Apparatus for controlling the temperature of an electric blanket having a heating element with an appreciable temperature coefficient of resistance, the combination comprising, a source of power, an electronic oscillator having an inductive feedback circuit, a loading circuit including said heating element, means continuously connecting said loading circuit in inductive relation to said feedback circuit so that changes in resistance of said element will affect the operation of said oscillator, further impedance means responsive to room temperature, means connecting said further impedance means in loading relation to said oscillator, and relay means connected in the energizing circuit of said oscillator, said relay means completing a power energizing circuit to said heating element only when said oscillator is operating in a predetermined manner.

JERRY HAGEN.

REFERENCES CITED

The following references are of record in the file of this patent:

UNITED STATES PATENTS

| Number | Name | Date |
| --- | --- | --- |
| 1,894,687 | Hyland | Jan. 17, 1933 |
| 1,951,276 | Edwards et al. | Mar. 13, 1934 |
| 2,086,966 | Shrader | July 13, 1937 |
| 2,093,745 | Westell | Sept. 21, 1937 |
| 2,169,977 | MacDonald | Aug. 15, 1939 |
| 2,189,462 | Donle et al. | Feb. 6, 1940 |
| 2,228,163 | Cohen | Jan. 7, 1941 |
| 2,234,895 | Cerveny et al. | Mar. 11, 1941 |
| 2,236,624 | Littwin | Apr. 1, 1941 |
| 2,290,091 | Brown et al. | July 14, 1942 |
| 2,340,605 | MacLaren | Feb. 1, 1944 |
| 2,429,819 | Jordan | Oct. 28, 1947 |
| 2,434,941 | Machlet | Jan. 27, 1948 |
| 2,455,379 | McLennan | Dec. 7, 1948 |
| 2,463,876 | Hills | Mar. 8, 1949 |
| 2,522,826 | Hooven | Sept. 19, 1950 |
| 2,531,313 | Wannamaker, Jr. | Nov. 21, 1950 |